United States Patent
Nakashio et al.

(10) Patent No.: US 11,393,506 B2
(45) Date of Patent: *Jul. 19, 2022

(54) CARTRIDGE MEMORY

(71) Applicant: Sony Corporation, Tokyo (JP)

(72) Inventors: Eiji Nakashio, Miyagi (JP); Kazuo Anno, Miyagi (JP); Takanobu Iwama, Miyagi (JP); Shinya Tochikubo, Miyagi (JP); Naohiro Adachi, Tokyo (JP); Minoru Yamaga, Miyagi (JP); Masayoshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,213

(22) Filed: Mar. 31, 2021

(65) Prior Publication Data

US 2021/0217441 A1     Jul. 15, 2021

Related U.S. Application Data

(63) Continuation of application No. 16/627,064, filed as application No. PCT/JP2019/004024 on Feb. 5, 2019, now Pat. No. 10,971,186.

(30) Foreign Application Priority Data

Apr. 3, 2018 (JP) .................................. 2018-072219

(51) Int. Cl.
*G11B 7/24097* (2013.01)
*G11B 20/12* (2006.01)
(Continued)

(52) U.S. Cl.
CPC ...... *G11B 20/1201* (2013.01); *G11B 5/00813* (2013.01); *G11B 33/04* (2013.01); *G11B 2220/90* (2013.01)

(58) Field of Classification Search
None
See application file for complete search history.

(56) References Cited

U.S. PATENT DOCUMENTS 5,786,955 A * 7/1998 Kori .................... G11B 27/11
                                                        360/72.1
6,373,799 B1 * 4/2002 Ono .................... G06K 7/10336
                                                        369/100

(Continued)

FOREIGN PATENT DOCUMENTS

CN          1148900 A       4/1997
CN          1325114 A      12/2001
(Continued)

OTHER PUBLICATIONS

International Search Report and Written Opinion issued in connection with PCT/JP2019/004024, dated Mar. 26, 2019. (6 pages).

(Continued)

*Primary Examiner* — Peter Vincent Agustin
(74) *Attorney, Agent, or Firm* — K&L Gates LLP (57) ABSTRACT

[Object] A cartridge memory according to an embodiment of the present technology is a cartridge memory for a recording medium cartridge, including: a memory unit; and a capacity setting unit. The memory unit has a memory capacity capable of storing management information relating to a second information recording medium configured to be capable of recording information with a second data track number larger than a first data track number. The capacity setting unit is configured to be capable of setting a data storage area limited to a first capacity capable of storing management information relating to a first information recording medium configured to be capable of recording information with the first data track number.

12 Claims, 4 Drawing Sheets

(51) Int. Cl.
  *G11B 5/008* (2006.01)
  *G11B 33/04* (2006.01)

(56) References Cited

U.S. PATENT DOCUMENTS

| | | | | |
|---|---|---|---|---|
| 7,100,010 | B2* | 8/2006 | Kato | G11B 15/04 |
| | | | | 360/60 |
| 9,436,853 | B1 | 9/2016 | Meyers | |
| 10,971,186 | B2* | 4/2021 | Nakashio | G06K 19/04 |
| 2002/0126999 | A1* | 9/2002 | Shimamoto | G11B 27/105 |
| | | | | 386/248 |
| 2004/0037004 | A1* | 2/2004 | Kitahara | G11B 15/07 |
| | | | | 360/133 |
| 2005/0027753 | A1* | 2/2005 | Akama | G11B 20/00007 |
| 2005/0080992 | A1* | 4/2005 | Massey | G06F 3/0608 |
| | | | | 711/114 |
| 2005/0133583 | A1* | 6/2005 | Tada | G11B 23/037 |
| | | | | 235/375 |
| 2006/0028936 | A1* | 2/2006 | Ninomiya | G11B 27/105 |
| | | | | 369/47.1 |
| 2007/0014615 | A1 | 1/2007 | Kasayama et al. | |
| 2007/0130418 | A1* | 6/2007 | Hori | G11B 20/10 |
| | | | | 711/111 |
| 2007/0206308 | A1* | 9/2007 | Bates | G11B 27/11 |
| | | | | 360/55 |
| 2007/0206309 | A1 | 9/2007 | Bates | |
| 2010/0208380 | A1 | 8/2010 | Hellman | |
| 2011/0163193 | A1 | 7/2011 | Tada | |
| 2015/0012716 | A1* | 1/2015 | Uchiyama | G06F 3/0682 |
| | | | | 711/154 |
| 2015/0116857 | A1* | 4/2015 | Ochi | G11B 5/00813 |
| | | | | 360/15 |
| 2021/0012804 | A1* | 1/2021 | Nakashio | G11B 33/04 |
| 2021/0217441 | A1* | 7/2021 | Nakashio | H01Q 1/24 |

FOREIGN PATENT DOCUMENTS

| | | |
|---|---|---|
| CN | 1645508 A | 7/2005 |
| CN | 1655187 A | 8/2005 |
| CN | 1783322 A | 6/2006 |
| CN | 101030428 A | 9/2007 |
| CN | 101170312 A | 4/2008 |
| CN | 101809664 A | 8/2010 |
| CN | 105938420 A | 9/2016 |
| EP | 1378908 A2 | 1/2004 |
| JP | 2007-007962 A | 1/2007 |
| JP | 2009-211743 A | 9/2009 |
| JP | 2011-034631 A | 2/2011 |
| JP | 2011-170945 A | 9/2011 |

OTHER PUBLICATIONS

Japanese Office Action dated Feb. 4, 2020 in corresponding Japanese Application No. 2019-572234.

ECMA:"ECMA-319: Data Interchange on 12,7 mm 384-Track Magnetic Tape Cartridges—Ultrium-1 Format",Internet Citation,Jun. 1, 2001 (Jun. 1, 2001), XP002395655, Retrieved from the Internet: URL:http://www.ecma-international.org/publications/files/ECMA-ST/Ecma-319.pdf [retrieved on Aug. 22, 2006]* p. 95-p. 115*.

* cited by examiner

CARTRIDGE MEMORY

CROSS-REFERENCE TO RELATED APPLICATIONS

This application is a continuation application of U.S. patent application Ser. No. 16/627,064, filed Dec. 27, 2019, which is a National Stage Entry of PCT/JP2019/004024, filed Feb. 5, 2019, which claims the benefit of priority from Japanese Patent Application No. 2018-072219, file Apr. 3, 2018, the entire contents of which are incorporated herein by reference.

TECHNICAL FIELD

The present technology relates to a cartridge memory storing management information of an information recording medium, a recording medium cartridge including this, and a method of producing the same.

BACKGROUND ART

In recent years, magnetic recording media are widely used for applications such as backup of electronic data. As one of the magnetic recording media, for example, a magnetic tape cartridge is increasingly attracting attention as a storage medium for big data or the like because it has a large capacity and can be preserved for a long time.

For example, a magnetic tape cartridge of the LTO (Linear Tape Open) standard is equipped with an RFID (Radio Frequency Identification) tag called a cartridge memory (see, for example, Patent Literature 1). Since the cartridge memory receives the signal magnetic field transmitted from a tape drive (reader/writer) to generate power, it is possible to perform communication with the reader/writer with no power supply. The cartridge memory includes an antenna and an IC chip for communication/recording, and is configured to be capable of reading/writing production management information, usage history, outlines of recorded content, and the like of cartridges and magnetic tapes.

CITATION LIST

Patent Literature

Patent Literature 1: Japanese Patent Application Laid-open No. 2009-211743

DISCLOSURE OF INVENTION

Technical Problem

In this type of magnetic recording medium, the number of data tracks (track density) differs for each generation, and a plurality of types of cartridge memories having different capacities has been prepared accordingly.

In view of the circumstances as described above, it is an object of the present technology to provide a cartridge memory, a recording medium cartridge, and a method producing the same that are commonly applicable to a plurality of generations of information recording media.

Solution to Problem

A cartridge memory according to an embodiment of the present technology is a cartridge memory for a recording medium cartridge including: a memory unit; and a capacity setting unit.

The memory unit has a memory capacity capable of storing management information relating to a second information recording medium configured to be capable of recording information with a second data track number larger than a first data track number.

The capacity setting unit is configured to be capable of setting, to the memory unit, a data storage area limited to a first capacity capable of storing management information relating to a first information recording medium configured to be capable of recording information with the first data track number.

The capacity setting unit may be configured to be capable of expanding the data storage area limited to the first capacity to a second capacity capable of storing management information relating to the second information recording medium.

The memory unit may have a memory capacity of not less than 32 kilobytes, and the capacity setting unit may be configured to set a data storage area having the first capacity of not more than 16 kilobytes to the memory unit.

The cartridge memory may further include a voltage generation unit that includes an antenna coil for transmission/reception and receives a signal magnetic field from an external device to generate a voltage.

A recording medium cartridge according to an embodiment of the present technology includes: a first information recording medium; and a cartridge memory.

The first information recording medium is configured to be capable of recording information with a first data track number.

The cartridge memory includes a memory unit and a capacity setting unit. The memory unit has a memory capacity capable of storing management information relating to a second information recording medium configured to be capable of recording information with a second data track number larger than the first data track number. The capacity setting unit is configured to be capable of setting, to the memory unit, a data storage area limited to a capacity capable of storing management information relating to the first information recording medium.

The first recording medium may be a magnetic recording medium.

The first recording medium may be a tape-like recording medium.

The first data track number may be not less than 6000.

A method of producing a recording medium cartridge according to an embodiment of the present technology, includes:
  preparing an information recording medium configured to be capable of recording information with a first data track number and a cartridge memory having a memory capacity capable of storing management information relating to a second information recording medium capable of recording information with a second data track number larger than the first data track number; and
  setting, to the memory unit, a data storage area limited to a capacity capable of storing management information relating to the first information recording medium configured to be capable of recording information with the first data track number.

Advantageous Effects of Invention

As described above, in accordance with the present technology, it is possible to provide a cartridge memory that is commonly applicable to a plurality of generations of information recording media. It should be noted that the effect described here is not necessarily limitative and may be any effect described in the present disclosure.

MODE(S) FOR CARRYING OUT THE INVENTION

Hereinafter, an embodiment of the present technology will be described with reference to the drawings.

Figure 1:
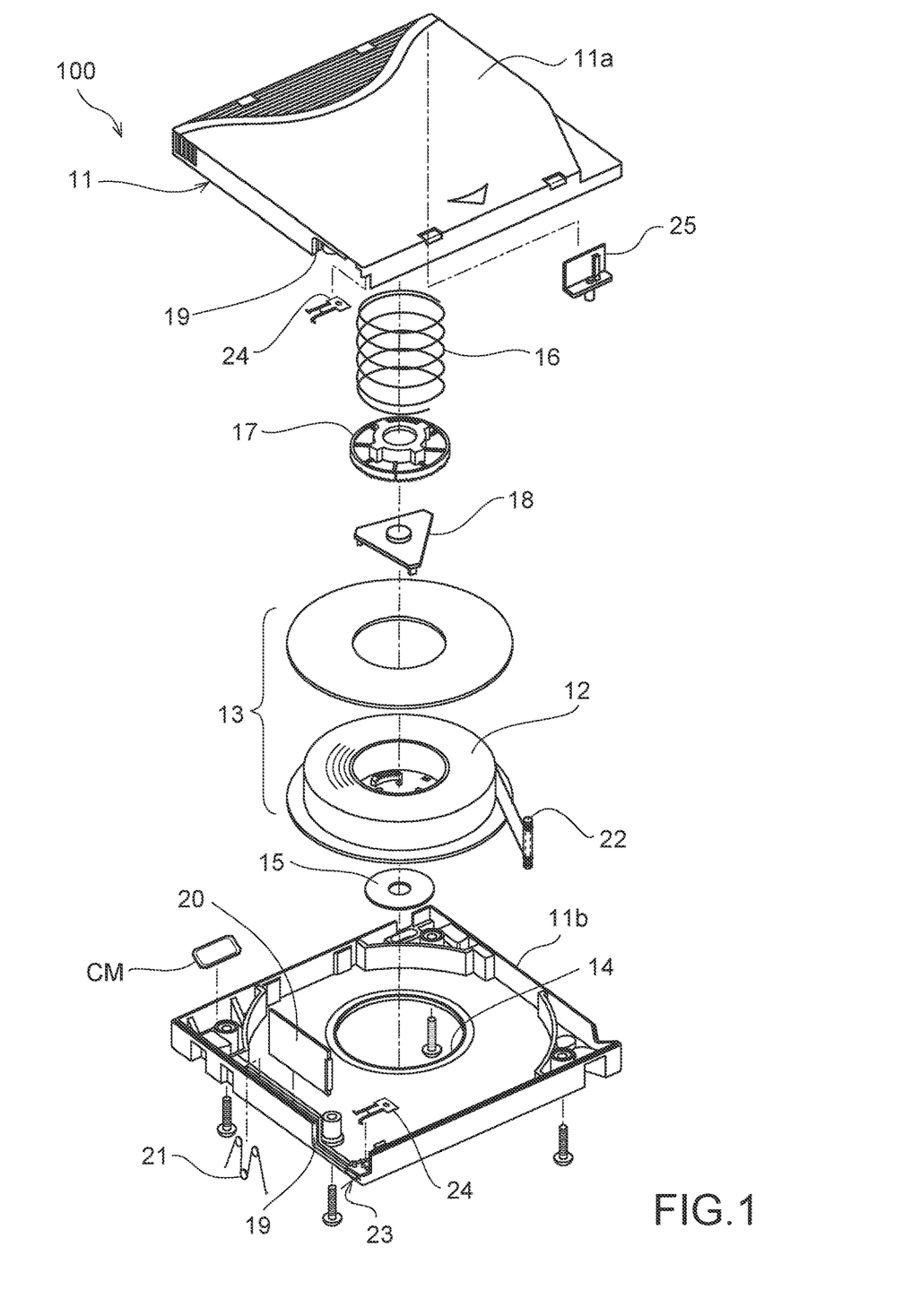
FIG. 1 is an exploded perspective view showing a magnetic tape cartridge according to an embodiment of the present technology.
Figure 2:
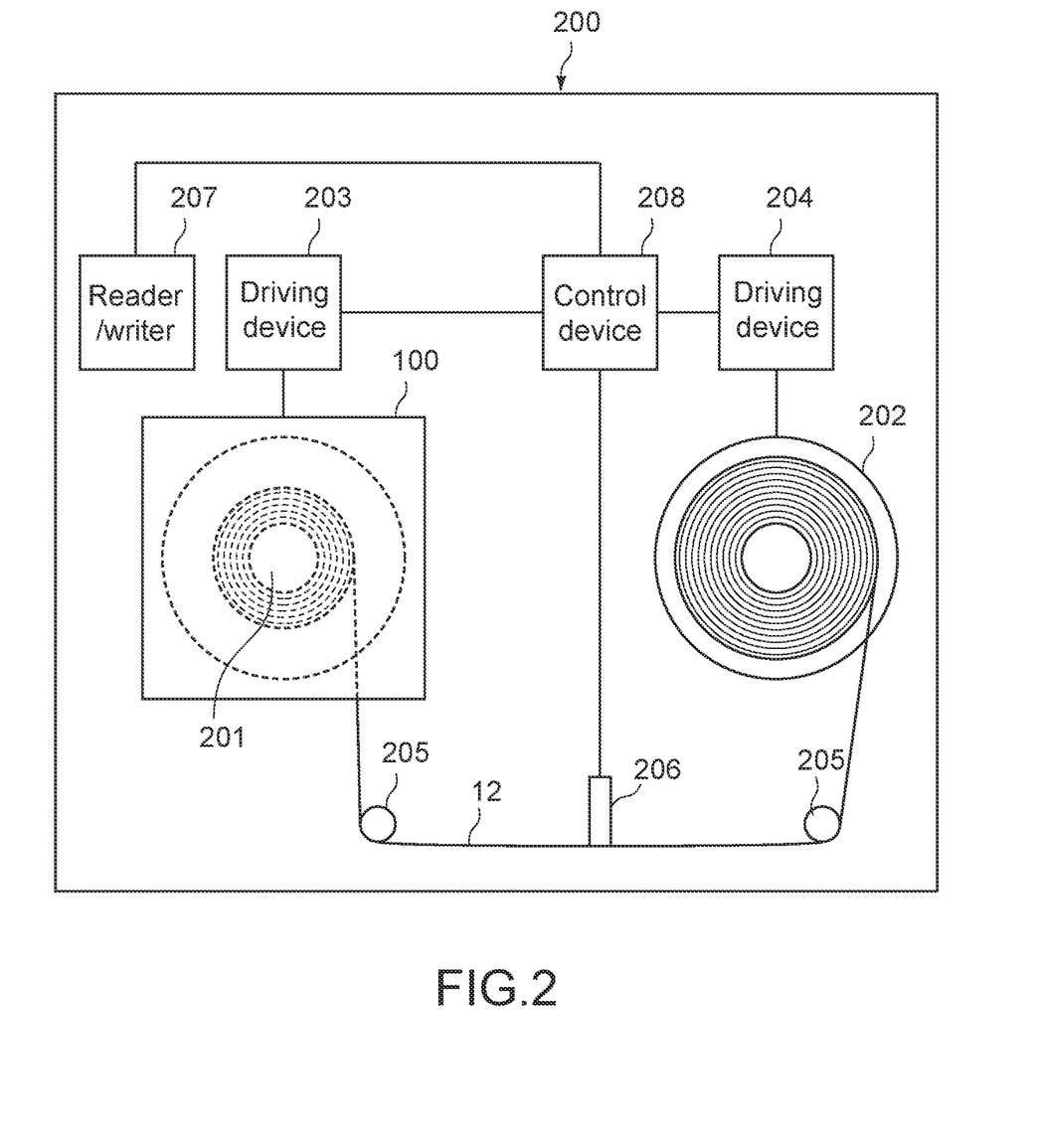
FIG. 2 is a schematic perspective view of a tape drive apparatus.

FIG. 1 is an exploded perspective view showing a magnetic tape cartridge according to an embodiment of the present technology, and FIG. 2 is a schematic perspective view of a tape drive apparatus. In this embodiment, as a recording medium cartridge, a magnetic tape cartridge (hereinafter, referred to as tape cartridge 100) of the LTO standard shown in FIG. 1 will be described as an example. Hereinafter, configurations of the tape cartridge 100 and a tape drive apparatus 200 shown in FIG. 2 will be schematically described.

Tape Cartridge

As shown in FIG. 1, the tape cartridge 100 includes a cartridge case 11 configured by connecting an upper shell 11a and a lower shell 11b by a plurality of screw members. Inside the cartridge case 11, a single tape reel 13 around which a magnetic tape 12 as a magnetic recording medium is wound is rotatably housed. In this embodiment, as the magnetic tape 12, a magnetic tape having the number of data tracks of, for example, not less than 6000 is used.

A chucking gear (illustration omitted) to be engaged with a spindle 201 (see FIG. 2) of the tape drive apparatus 200 is annularly formed at the center of the bottom of the tape reel 13. The chucking gear is exposed to the outside via an opening 14 formed at the center of the lower shell 11b. On the inner peripheral side of this chucking gear, an annular metal plate 15 to be magnetically attracted to the spindle 201 is fixed.

A reel spring 16, a reel lock member 17, and a spider 18 are disposed between the inner surface of the upper shell 11a and the tape reel 13. They configure a reel lock mechanism that suppresses rotation of the tape reel 13 when the tape cartridge 100 is not used.

At one side wall part of the cartridge case 11, a tape outlet 19 for drawing out one end of the magnetic tape 12 to the outside is provided. Inside the side wall part, a slide door 20 that opens/closes the tape outlet 19 is disposed. The slide door 20 is configured to slide in the direction of opening the tape outlet 19 against the biasing force of a torsion spring 21 by the engagement with a tape loading mechanism (illustration omitted) of the tape drive apparatus 200.

A leader pin 22 is fixed to one end of the magnetic tape 12. The leader pin 22 is configured to be attachable/detachable to/from a pin holding part 23 provided on the inner side of the tape outlet 19. The pin holding part 23 includes elastic holders 24 that elastically hold the upper end and the lower end of the leader pin 22 in the upper wall inner surface (inner surface of the upper shell 11a) of the cartridge case 11 and the bottom wall inner surface (inner surface of the lower shell 11b).

Then, in addition to a safety tab 25 for preventing erroneous erasure of information recorded in the magnetic tape 12, a cartridge memory CM capable of reading/writing, without contact, content relating to information recorded in the magnetic tape 12 is disposed inside the other side wall of the cartridge case 21. The cartridge memory CM includes a noncontact communication medium equipped with, an antenna coil, an IC chip and the like on a substrate.

Tape Drive Apparatus

As shown in FIG. 2, the tape drive apparatus 200 is configured to be capable of loading the tape cartridge 100. Although the tape drive apparatus 200 is configured to be capable of loading one tape cartridge 100, it may be configured to be capable of simultaneously loading a plurality of tape cartridges 100.

The tape drive apparatus 200 includes the spindle 201, a take-up reel 202, a spindle drive device 203, a reel drive device 204, a plurality of guide rollers 205, a head unit 206, a reader/writer 207, a control device 208, and the like.

The spindle 201 includes a head part to be engaged with the chucking gear of the tape reel 13 via the opening 14 formed in the lower shell 11b of the tape cartridge 100. The spindle 201 raises the tape reel 13 by a predetermined distance against the biasing force of the reel spring 16 to release the reel lock function by the reel lock member 17. As a result, the tape reel 13 is rotatably supported by the spindle 201 inside the cartridge case 11.

The spindle drive device 203 causes, in response to a command from the control device 208, the spindle 201 to rotate. The take-up reel 202 is configured to be capable of fixing the tip (leader pin 22) of the magnetic tape 12 pulled out of the tape cartridge 100 via tape loading mechanism (not shown). The plurality of guide rollers 205 guide travelling of the magnetic tape 12 so that a tape path formed between the tape cartridge 100 and the take-up reel 202 has a predetermined relative positional relationship with the head unit 206. The reel drive device 204 causes, in response to a command from the control device 208, the take-up reel 202 to rotate. When recording/reproduction of a data signal is performed on the magnetic tape 12, the spindle drive device 203 and the reel drive device 204 respectively cause the spindle 201 and the take-up reel 202 to rotate, and thus, the magnetic tape 12 travels.

The head unit 206 is configured to be capable of recording a data signal in the magnetic tape 12 or reproducing a data signal written to the magnetic tape 12, in response to a command from the control device 208.

The reader/writer 207 is configured to be capable of reading predetermined management information from the cartridge memory CM mounted on the tape cartridge 100 or recording predetermined management information in the cartridge memory CM, in response to a command from the control device 208. As a communication method between the reader/writer 207 and the cartridge memory CM, for example, an ISO 14443 method is adopted.

The control device 208 includes, for example, a computer including a CPU (Central Processing Unit), a storage unit, a communication unit, and the like, and integrally controls the respective units of the tape drive apparatus 200.

Cartridge Memory

Subsequently, details of the cartridge memory CM will be described.

Basic Configuration

Figure 3:
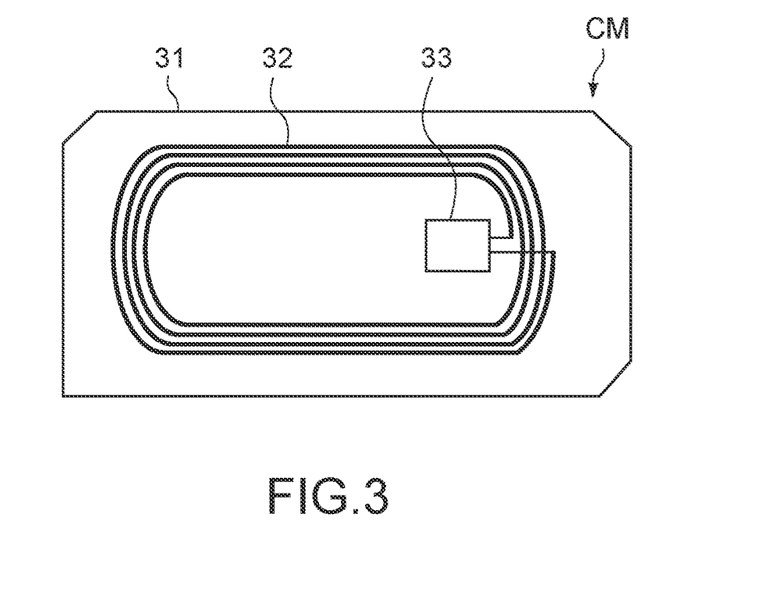
FIG. 3 is a schematic plan view showing a cartridge memory according to an embodiment of the present technology.

FIG. 3 is a schematic plan view showing the cartridge memory CM. The cartridge memory CM includes an RFID tag including a support substrate 31, an antenna coil 32, and an IC chip 33.

The support substrate 31 includes a relatively rigid wiring substrate such as a glass epoxy substrate. The antenna coil 32 is a flat loop coil formed on the support substrate 31, and includes copper foil, aluminum foil, or the like having a predetermined thickness. The IC chip 33 is mounted on the support substrate 31, and electrically connected to the antenna coil 32. The IC chip 33 incorporates a voltage generation unit that generates a start voltage on the basis of the signal magnetic field received from the reader/writer 207 via the antenna coil 32, a memory unit that stores predetermined management information relating to the tape cartridge 100, a controller that reads information from the memory unit, and the like.

Examples of the management information include product information and usage history information of the tape cartridge 100 and the magnetic tape 12, outlines of information recorded in the magnetic tape 12, and the like.

The product information includes production information, the number of data tracks of the magnetic tape 12, and unique information such as ID. The production information includes, for example, a material (e.g., polyethylene terephthalate (PET)) of a base film constituting the magnetic tape 12, a thermal expansion coefficient (e.g., 15E-6 mm/mm/° C.) thereof, and a humidity expansion coefficient (e.g., 12E-6 mm/mm/RH %).

Examples of the usage history information include access date and time, address information, communication history with the reader/writer 207, and presence or absence of abnormality at the time of loading/unloading to the tape drive apparatus 200.

As the outlines of information recorded in the magnetic tape 12, servo tracking information at the time of initial signal recording may be included. The servo tracking information includes, for example, deviation from a standard value between certain servo bands, i.e., information regarding the difference from a standard value of the distance between servo bands read by the head mechanism (the head unit 206) at the time of initial tracking may be included. Alternatively, the servo tracking information may include information regarding the positions of the servo bands at the time of initial tracking.

Since the cartridge memory CM receives the signal magnetic field transmitted from the reader/writer 207 by the antenna coil 32 to generate power, it operates with no power supply. The power supply/communication frequency from the reader/writer 207 is 13.56 MHz that is the same as that of NFC (Near Field Communication). As the memory to be incorporated in the IC chip 33, a non-volatile memory (NVM) is used.

The number of data tracks of the magnetic tape cartridge of the LTO standard increases and the recording capacity is dramatically improved for each generation. As an example, the number of data tracks has increased from 384 in the initial LTO-1 to 512, 704, 896, 1280, 2176, 3584, and 6656 in LTO-2 to LTO8, respectively. Similarly, the recording capacity of data has increased from 100 GB (gigabytes) in LTO-1 to 200 GB, 400 GB, 800 GB, 1.5 TB (terabytes), 2.5 TB, 6.0 TB, and 12 TB in LTO-2 to LTO-8, respectively.

Since the amount of management information stored in a cartridge memory increases with the increase in the number of data tracks of a magnetic tape, the capacity of the cartridge memory (memory capacity) is also increasing. For example, it has increased from 4 kB (kilobytes) in LTO-1 and LTO-2 to 8 kB in LTO-3 to LTO-5 and 16 kB in LTO-6 to 8. Therefore, it is expected that as the amount of data that can be recorded in LTO increases, also the memory capacity of the cartridge memory will further increase in the future.

As described above, since a plurality of types of cartridge memories needs to be prepared for the magnetic tape cartridge of the LTO standard for each generation, an increase in production cost and management cost cannot be avoided. In this regard, the cartridge memory CM according to this embodiment is configured to be commonly applicable to LTOs of a plurality of generations. Hereinafter, details of the cartridge memory CM will be described.

Details of Cartridge Memory

Figure 4:
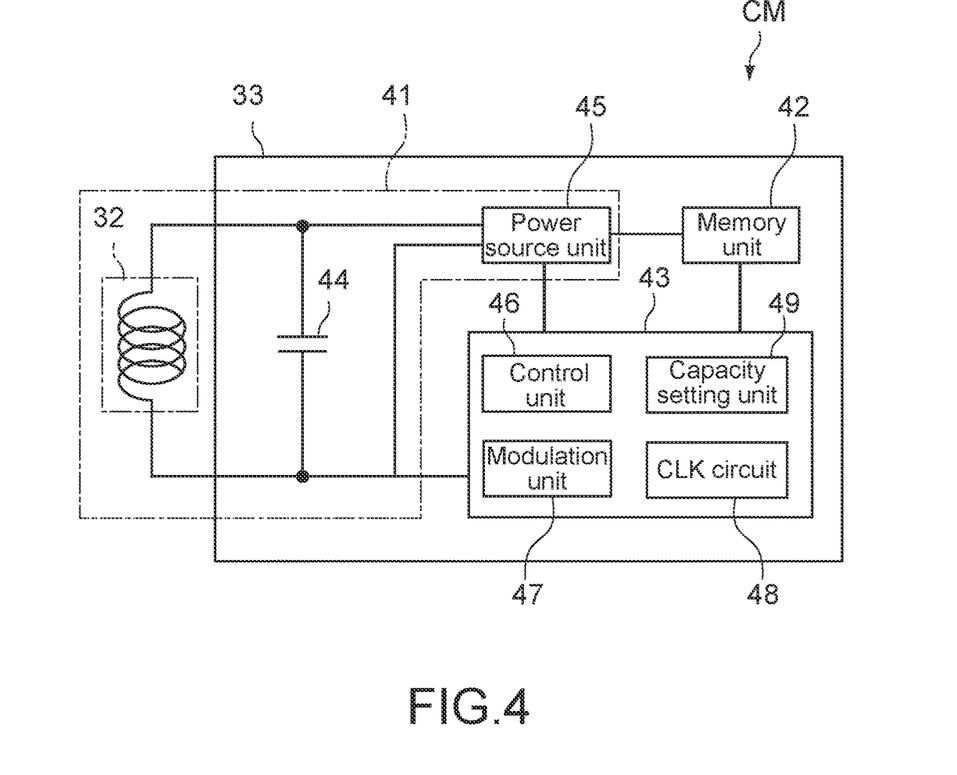
FIG. 4 is a block diagram showing a configuration of the cartridge memory.

FIG. 4 is a block diagram showing a configuration of the cartridge memory CM according to this embodiment. The cartridge memory CM includes a voltage generation unit 41, a memory unit 42, and a control unit 43.

The voltage generation unit 41 includes the antenna coil 32, a resonant capacity 44, and a power source unit 45. The voltage generation unit 41 is configured to be capable of receiving the signal magnetic field transmitted from the reader/writer 207 (see FIG. 2) that is an external device to generate a voltage.

The resonant capacity 44 is connected to the antenna coil 32 in parallel to constitute a resonant circuit. The resonant capacity 44 may include a single capacitive device or a parallel circuit or series circuit of a plurality of capacitive devices. In the case where the resonant capacity 44 includes a plurality of capacitive devices, the resonant capacity 44 may further include a plurality of switching devices (transistors or the like) capable of adjusting the resonance frequency of the above-mentioned resonant circuit by electrically connecting or disconnecting an arbitrary capacitive device of the plurality of capacitive devices in response to a command from the control unit 43.

The power source unit 45 is a power source circuit that generates a voltage from the resonant circuit configured by the antenna coil 32 and the resonant capacity 44, and includes a rectifier circuit that converts alternating current to direct current, a regulator, an AD converter that converts an analog signal to a digital signal, and the like.

The memory unit 42 includes a semiconductor memory device such as a non-volatile memory. The memory unit 42 may include a memory controller that controls driving of the memory device. The memory unit 42 has a data storage area in which a circuit parameter of the voltage generation unit 41 and predetermined management information are to be stored.

Although the capacity of the memory unit 42 (memory capacity) is usually selected in accordance with the number of data tracks of the magnetic tape 12, the memory unit 42 has a certain capacity that does not depend on the number of data tracks of the magnetic tape, which is, for example, not less than 32 kB in this embodiment. This memory capacity is compatible with not only the LTO tape cartridges of the eighth generation and earlier (to LTO-8) but also the LTO tape cartridges of the ninth generation and later. Among these, the capacity of the data storage area for storing management information is set depending on the number of data tracks of the applied magnetic tape 12 by a capacity setting unit 49 described below.

Examples of the circuit parameter include a capacity setting value for setting the resonant capacity 44, and various adjustment values for adjusting the circuit characteristics of the power source unit 45. Examples of the predetermined management information include information relating to the tape cartridge 100 on which the cartridge memory CM is mounted as described above, e.g., identification information (ID) of the tape cartridge 100 or the cartridge memory CM or management information of data recorded in the magnetic tape 12. At least a part of the management information includes one that is to be updated in response to a writing command from the reader/writer 207 or newly written to the memory unit 42.

The control unit 43 includes a controller 46, a modulation unit 47, a clock signal generation path 48, and the capacity setting unit 49.

The controller 46 includes a computer including a CPU (Central Processing Unit) and an internal memory. The controller 46 executes various programs stored in the internal memory to integrally control the respective units of the cartridge memory CM. The internal memory includes a non-volatile memory that stores the programs and various parameters, and a volatile memory to be used as a work area. The various programs may by read from portable storage medium or downloaded from a server apparatus on the network.

The modulation unit 47 is a block that processes the signal received from the reader/writer 207 via the antenna coil 32 or generates a signal to be transmitted to the reader/writer 207 via the antenna coil 32, and includes a transmission/reception circuit including a modulation circuit, a demodulation circuit, a detection circuit, and the like.

The clock signal generation unit 48 is configured to be capable of supplying a clock signal of a predetermined frequency to the memory unit 42 in response to a command from the controller 46. By the frequency of the clock signal, the reading speed of data from the memory unit 42 and the writing speed of data to the memory unit 42 are determined.

The clock signal generation unit 48 typically includes one divider or a plurality of dividers. The plurality of dividers may be connected in series or in parallel. The clock signal generation unit 48 supplies the frequency obtained by dividing the frequency of a reference clock to the memory unit 42 as a clock signal. As the reference clock, for example, the communication frequency (13.56 MHz) of the reader/writer 207 is used. The frequency of the clock signal in this case is, for example, 848 kHz that is $\frac{1}{16}$ of the frequency of the reference clock, or 3.39 MHz that is $\frac{1}{4}$ of the frequency of the reference clock.

The capacity setting unit 49 is a block that sets the capacity of the data storage area of the memory unit 42 on the basis of a command from the controller 46. The capacity setting unit 49 may configured as a part of the controller 46 or a part of the memory unit 42.

The cartridge memory CM according to this embodiment includes: the memory unit 42 that has a memory capacity capable of storing management information relating to a second information recording medium configured to be capable of recording information with a second data track number larger than a first data track number; and the capacity setting unit 49 configured to be capable of setting, to the memory unit 42, a data storage area limited to a first capacity capable of storing management information relating to a first information recording medium configured to be capable of recording information with the first data track number.

As described above, in this embodiment, the memory unit 42 includes a memory device having a larger capacity (32 kB) than the memory capacity (16 kB) to be applied to LTO-8. Therefore, since the cartridge memory CM according to this embodiment is applicable to not only LTO-8 but also the LTO of the generation in which the number of data tracks is larger than that of LTO-8 and the LTOs of earlier generations, it can be commonly used for a plurality of generations. Meanwhile, if the capacity of the data storage area in which management information of the tape cartridge 100 is to be stored is unnecessarily large, the accessibility to the management information is reduced, and there is a possibility that information cannot be transferred within the time allocated for communication with the reader/writer 207. Further, the power consumption increases and the system goes down due to shortage in power that can be acquired by the voltage generation unit 41 in some cases.

In this regard, in this embodiment, the capacity setting unit 49 capable of variably setting the capacity of the data storage area in the memory unit 42 is provided. The capacity setting unit 49 is configured to be capable of setting the capacity of the data storage area to a capacity capable of storing management information relating to the magnetic tape 12 in the memory capacity of the memory unit 42.

For example, in the case where the number of data tracks of the magnetic tape 12 is 2176 to 6656 of the LTO-6 to LTO-8 specifications, the capacity setting unit 49 limits the data storage area in the memory capacity (32 kB) of the memory unit 42 to the capacity (16 kB) of the LTO-6 to LTO-8 specifications. Alternatively, in the case where the number of data tracks of the magnetic tape 12 is 704 to 1280 of the LTO-3 to LTO-5 specifications, the capacity setting unit 49 limits the data storage area to 8 kB of the LTO-3 to LTO-5 specifications.

Figure 5:
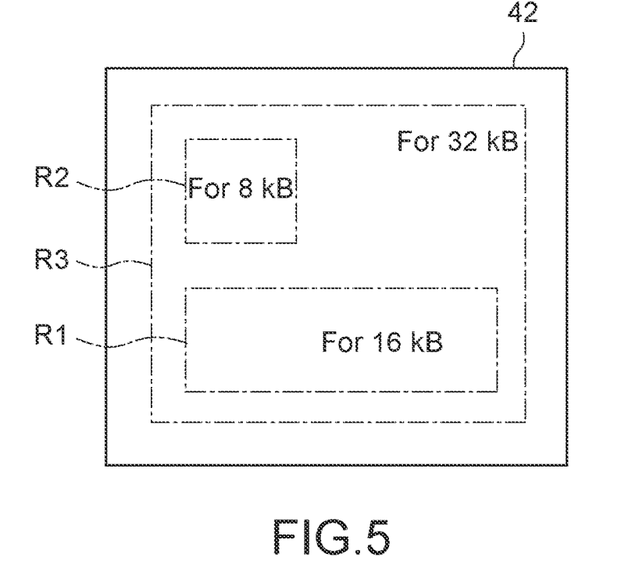
FIG. 5 is a conceptual view showing a relationship between a memory unit and a data storage area in the cartridge memory.

The aspect of the limitation of the data storage area by the capacity setting unit 49 is not particularly limited, and the number of data blocks used for storing management information may be limited or management information may be set to be stored only for a specific address. FIG. 5 is a conceptual diagram showing the relationship between the memory unit 42 and the data storage area. An area R1 and an area R2 respectively indicate a data storage area for 16 kB and a data storage area for 8 kB.

As shown in the figure, the entire capacity of the memory unit 42 is not allocated as a data storage area for storing management information relating to the magnetic tape 12, but is optimized to the capacity of the data storage area in accordance with the generation of LTO (in accordance with the number of data tracks of the magnetic tape 12). As a result, since the accessibility to the management information is secured, it is possible to transfer information within the time allocated for communication with the reader/writer 207. Further, since the increase in power consumption can be suppressed, it is possible to prevent the system from going down due to power shortage.

The areas R1 and R2 do not necessarily need to be configured by physically different data blocks, and may be set as areas in which at least parts thereof overlap with each other. Alternatively, a data storage area with a capacity of the spec or greater may be set, and the address may be thinned to store information.

The capacity setting unit 49 may be configured to create a different data format for each data storage area, and cause the controller 46 to execute reading or writing control of information based on the data format. As a result, since the controller 46 does not need to execute the control procedure different for each capacity of the data storage area, it is possible to reduce the load on the controller 46.

Note that the memory area other than the capacity-limited data expansion area may be left as an area in which no data is stored, or may be used as an area for storing information other than the management information. Examples of the information other than the management information include information that can be arbitrarily written by a user, and image data and text data relating to information to be recorded in the magnetic tape 12.

Further, the capacity setting unit 49 is configured to be capable of expanding the above-mentioned data storage area limited to the first capacity to a second capacity capable of storing management information relating to the above-mentioned second information recording medium.

For example, the capacity setting unit 49 is configured to be capable of expanding the data expansion area R1 limited to 16 kB (first capacity) to, for example, a data expansion area R3 of 32 kB (second capacity). As a result, in the case where a tape cartridge having high performance in which the number of data tracks of the magnetic tape increases and also the amount of management information increase accordingly is produced, it is possible to reset the memory unit 42 set to the data expansion area corresponding to 16 kB to a data expansion area corresponding to 32 kB. That is, it is possible to reuse, as a cartridge memory applicable to a tape cartridge of the next generation, a cartridge memory set for a tape cartridge of the current generation as a target.

Figure 6:
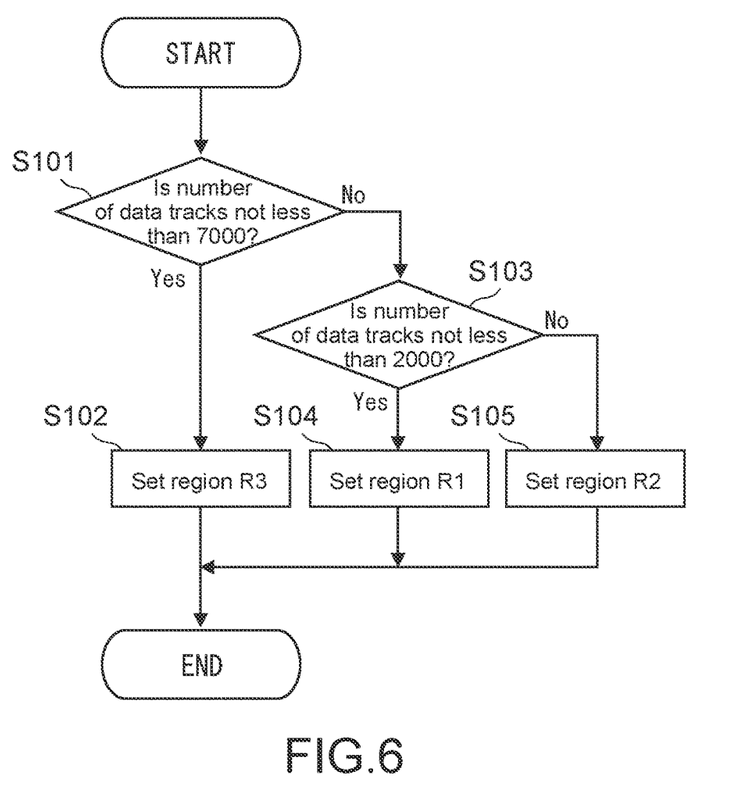
FIG. 6 is a diagram showing a procedure of setting the data storage area.

The capacity setting unit 49 sets a data storage area to the memory unit 42 on the basis of a command from the controller 46. The setting of the data storage area is typically performed at the time when the tape cartridge 100 is produced. FIG. 6 is a diagram showing the procedure of setting the data storage area.

The tape cartridge 100 is produced by incorporating various components such as the magnetic tape 12 (tape reel 13) prepared in advance, the reel lock mechanism, the slide door, and the cartridge memory CM in the cartridge case 11 at predetermined positions. The cartridge memory CM sets a data storage area corresponding to the type (number of data tracks) of the magnetic tape 12 to the memory unit 42 by using a dedicated communication device. For example, the data storage area R3 for 32 kB (see FIG. 5) is set in the case where the number of data tracks of the magnetic tape 12 is not less than 7000 (Steps 101 and 102), and the data storage area R1 for 16 kB is set in the case where the number of data tracks is not less than 2000 and less than 7000 (Steps 103 and 104). In the case where the number of data tracks is less than 2000, the data storage area R2 for 8 kB is set (Steps 103 and 105).

As described above, in accordance with the cartridge memory CM according to this embodiment, since it includes a memory unit having a certain memory capacity that does not depend on the number of data tracks, one type of cartridge memory CM can be commonly applied to LTO cartridges of all generations. As a result, since it is not necessary to prepare a plurality of types of different cartridge memories for each generation, production cost and management cost can be reduced. Further, it is possible to cope with the future increase in the number of data tracks by one type of cartridge memory CM.

Further, since the capacity setting unit 49 is configured to be capable of expanding the data storage area of the memory unit 42, it is possible to easily cope with the future increase in the number of data tracks. Therefore, the cartridge memory CM can be continuously used without replacing it with another cartridge memory having a large memory capacity.

MODIFIED EXAMPLE

Although an embodiment of the present technology has been described above, it goes without saying that the present technology is not limited to the above-mentioned embodiment and various modifications can be made.

For example, although the memory capacity of the memory unit 42 in the cartridge memory CM has been 32 kB in the above-mentioned embodiment, the present technology is of course not limited thereto, and may include a memory unit having a memory capacity of not less than 32 kB, i.e., 64 kB or 128 kB.

Although the cartridge memory to be mounted on the magnetic tape cartridge of the LTO standard has been described as an example in the above-mentioned embodiment, the present technology is not limited thereto, and it is applicable also to a cartridge memory for a magnetic tape cartridge of another standard other than LTO.

Further, the present technology is applicable also to another information recording medium other than a magnetic tape (tape-like recording medium), such as an optical disc, a magnetic disc, a magneto-optical disc, a semiconductor memory, and a cartridge memory for a portable hard disc drive.

It should be noted that the present technology may take the following configurations.

(1) A cartridge memory for a recording medium cartridge, including:

a memory unit that has a memory capacity capable of storing management information relating to a second information recording medium configured to be capable of recording information with a second data track number larger than a first data track number; and a capacity setting unit configured to be capable of setting, to the memory unit, a data storage area limited to a first capacity capable of storing management information relating to a first information recording medium configured to be capable of recording information with the first data track number.

(2) The cartridge memory according to (1) above, in which the capacity setting unit is configured to be capable of expanding the data storage area limited to the first capacity to a second capacity capable of storing management information relating to the second information recording medium.

(3) The cartridge memory according to (1) or (2) above, in which the memory unit has a memory capacity of not less than 32 kilobytes, and the capacity setting unit sets a data storage area having the first capacity of not more than 16 kilobytes to the memory unit.

(4) The cartridge memory according to any one of (1) to (3) above, further including a voltage generation unit that includes an antenna coil for transmission/reception and receives a signal magnetic field from an external device to generate a voltage.

(5) A recording medium cartridge, including:
a first information recording medium configured to be capable of recording information with a first data track number; and
a cartridge memory that includes a memory unit having a memory capacity capable of storing management information relating to a second information recording medium configured to be capable of recording information with a second data track number larger than the first data track number, and a capacity setting unit configured to be capable of setting, to the memory unit, a data storage area limited to a capacity capable of storing management information relating to the first information recording medium.

(6) The recording medium cartridge according to (5) above, in which
the first recording medium is a magnetic recording medium.

(7) The recording medium cartridge according to (6) above, in which
the first recording medium is a tape-like recording medium.

(8) The recording medium cartridge according to (7) above, in which
the first data track number is not less than 6000.

(9) A method of producing a recording medium cartridge, including:
preparing an information recording medium configured to be capable of recording information with a first data track number and a cartridge memory having a memory capacity capable of storing management information relating to a second information recording medium capable of recording information with a second data track number larger than the first data track number; and
setting, to the memory unit, a data storage area limited to a capacity capable of storing management information relating to the first information recording medium configured to be capable of recording information with the first data track number.

REFERENCE SIGNS LIST 11 cartridge case
12 magnetic tape
32 antenna coil
33 IC chip
41 voltage generation unit
42 memory unit
43 control unit
46 controller
49 capacity setting unit
100 tape cartridge
200 tape drive apparatus
CM cartridge memory

The invention claimed is:

1. A cartridge memory for a recording medium cartridge, comprising:
a memory that has a memory capacity capable of storing information relating to a second information recording medium configured to be capable of recording information with a second data track number larger than a first data track number; and
a capacity setting configured to be capable of setting, to the memory, a data storage area including a first capacity capable of storing information relating to a first information recording medium configured to be capable of recording information with the first data track number.

2. The cartridge memory according to claim 1, wherein the capacity setting is configured to be capable of expanding the data storage area to a second capacity capable of storing information relating to the second information recording medium.

3. The cartridge memory according to claim 1, wherein the memory capacity is not less than 32 kilobytes, and the capacity setting sets the data storage area having the first capacity of not more than 16 kilobytes to the memory.

4. The cartridge memory according to claim 1, further comprising
a voltage generator that includes an antenna coil for transmission/reception and receives a signal magnetic field from an external device to generate a voltage.

5. The cartridge memory of claim 1, wherein the memory capacity is capable of storing management information relating to the second information recording medium.

6. A recording medium cartridge, comprising:
a first information recording medium configured to be capable of recording information with a first data track number; and
a cartridge memory that includes a memory having a memory capacity capable of storing information relating to a second information recording medium configured to be capable of recording information with a second data track number larger than the first data track number, and a capacity setting configured to be capable of setting, to the memory, a data storage area including a capacity capable of storing information relating to the first information recording medium.

7. The recording medium cartridge according to claim 6, wherein
the first recording medium is a magnetic recording medium.

8. The recording medium cartridge according to claim 7, wherein
the first recording medium is a tape-like recording medium.

9. The recording medium cartridge according to claim 8, wherein
the first data track number is not less than 6000.

10. The recording medium cartridge of claim 6, wherein the memory capacity is capable of storing management information relating to the second information recording medium.

11. A method of producing a recording medium cartridge, comprising:
preparing an information recording medium configured to be capable of recording information with a first data track number and a cartridge memory having a memory capacity capable of storing information relating to a second information recording medium capable of recording information with a second data track number larger than the first data track number; and
setting, to the memory, a data storage area including a capacity capable of storing management information relating to the first information recording medium configured to be capable of recording information with the first data track number.

12. The method of claim 11, wherein the memory capacity is capable of storing management information relating to the second information recording medium.

* * * * *